Sept. 10, 1968 S. YANDO 3,401,348

FERROELECTRIC AMPLIFIER

Filed Dec. 23, 1965 2 Sheets-Sheet 1

INVENTOR.
STEPHEN YANDO

BY

R. J. Frank
ATTORNEY.

Sept. 10, 1968 S. YANDO 3,401,348

FERROELECTRIC AMPLIFIER

Filed Dec. 23, 1965 2 Sheets-Sheet 2

INVENTOR
STEPHEN YANDO

BY R. J. Frank
ATTORNEY

United States Patent Office 3,401,348

Patented Sept. 10, 1968

3,401,348

FERROELECTRIC AMPLIFIER

Stephen Yando, Huntington, N.Y., assignor to General Telephone and Electronics Laboratories, Inc., a corporation of Delaware Filed Dec. 23, 1965, Ser. No. 515,943
8 Claims. (Cl. 330—7)

Figure 1:
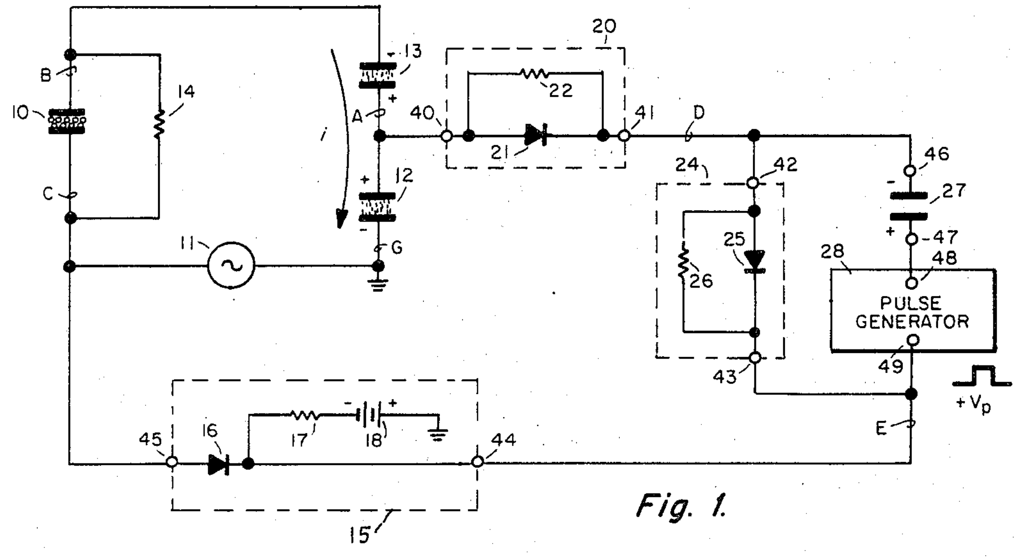

This invention relates to voltage amplifiers employing ferroelectric capacitors and in particular to an amplifier circuit which includes means for storing a voltage having a magnitude corresponding to the magnitude of an applied input signal for a predetermined interval of time after the input signal has been removed.

In electronic systems there are many applications for an amplifier which can receive a short duration input signal, apply a voltage corresponding to that signal across a load element, and maintain the load in an energized state for a predetermined interval of time after the input signal has been removed. For example, in solid state video display devices employing large numbers of electroluminescent light-emitting picture elements, an amplifier of this type may be coupled to each of the picture elements. The video signal is applied sequentially to the input of each amplifier during the frame period thereby sequentially energizing the electroluminescent picture elements. The interval during which the video signal is applied to each amplifier is usually quite short but, due to their storage capabilities, the amplifiers maintain voltage across the elements causing them to emit light for most of the frame period. At the end of the frame period, video pulses are again applied to each amplifier and the brightness of the light emitted by the electroluminescent elements is adjusted to the level of the new signal. By maintaining the voltage across the elements during the frame period, the average brightness of the display is greater than if the elements were only momentarily energized and there is substantially less flicker.

In solid state display devices of the type described, the electroluminescent elements are generally excited through variable impedance control elements by an alternating voltage source, the portion of the alternating voltage appearing across each electroluminescent element being determined by the magnitude of the input voltage. In these circuits, an input signal having a magnitude which is substantially less than the peak value of the alternating voltage source may be employed to control the energization of the elements by connecting each electroluminescent element in series with one or more ferroelectric capacitors and an alternating voltage excitation source. One such circuit is described in my copending U.S. patent application Ser. No. 347,300, entitled, "Ferroelectric Amplifier," filed Feb. 25, 1964.

The ferroelectric capacitor is a device which has a substantially rectangular voltage-charge characteristic such that the capacitor retains a remanent charge when no voltage is applied to its terminals and has zero charge when a voltage, termed the coercive voltage is impressed upon it. The polarity of the charge is dependent upon the polarity of the voltage last applied to the capacitor and is retained as a polarization of the dielectric rather than as a surface charge on the plates of the capacitor. By varying the charge on the ferroelectric capacitor in accordance with the input signal, the voltage appearing across the series-connected electroluminescent element may be readily controlled.

The minimum response time of the amplifier circuit is determined by the time required to switch the domains in the ferroelectric capacitors, i.e., the time required for the polarization of the dielectric to change. In addition, the magnitude of the input signal necessary to provide a given change in the polarization of the dielectric is an inverse function of the duration of the input signal. As a result, greater magnitude input signals are required as the pulse width of the input signal source is decreased. The above-mentioned circuit enables the switching of the domains to occur at reasonably low voltages, such as 10 to 20 volts, for pulse widths of about 0.5 microsecond. As a result, the amplifier exhibits a relatively high power gain.

However, in many applications, such as television displays, the duration of the input pulses is less than 0.1 microsecond and the magnitude of the pulses must be increased in order to switch the domains of the dielectric in the ferroelectric capacitor. The increasing of the input pulse magnitude decreases the power gain of the amplifier circuit since the pulse magnitude approaches the magnitude of the alternating voltage source. The degradation of the gain of the amplifier circuit for pulses of decreasing duration may be substantially decreased by employing a synchronizing circuit, as described in my previously cited copending application Ser. No. 347,300, wherein the input pulses are applied to the ferroelectric capacitor only during a predetermined portion of the alternating voltage cycle at which maximum control can be obtained with a signal of given magnitude.

Accordingly, it is an object of my invention to provide an improved ferroelectric amplifier in which the voltage across a load, such as an electroluminescent element, can be controlled by an input signal having a magnitude which is much lower than the peak value of the voltage exciting the element and a duration which may be short compared to the time required to switch the domains of the ferroelectric amplifier.

Another object is to provide a ferroelectric amplifier wherein the need for a synchronizing circuit is eliminated.

Still another object is to provide a ferroelectric amplifier in which the power gain is maintained substantially independent of the duration of the input signals.

In the present invention, an amplifier is provided in which a load element, such as an electroluminescent element, is connected in series with first and second ferroelectric capacitors and an alternating voltage source. A ferroelectric capacitor has a substantially rectangular voltage-charge characteristic so that it exhibits a hysteretic effect. The polarity of the remanent charge on the capacitor is dependent upon the polarity of the last applied voltage and is retained as a polarization of the dielectric rather than as a surface charge on the plates of the capacitor.

A first terminal of a first asymmetrically conductive switch is connected to the junction of the capacitors and a second terminal of the switch is connected to the first terminal of a capacitor. In addition, the first terminal of a second asymmetrically conductive switch is connected to the junction of the first switch and the capacitor. The asymmetrically conductive switches which may, for example, be diodes, are highly conductive for current flowing in one direction but present a high impedance to current flowing in the opposite direction.

The second terminal of the capacitor and the second terminal of the second switch are connected to the first and second terminals of an input signal source respectively. A bias voltage generator is coupled to one of the terminals of the input signal source. The bias voltage generator maintains an instantaneous voltage on this terminal having essentially the same waveform as the voltage at the junction between the ferroelectric capacitors but of greater magnitude.

The first and second switches are poled so that they normally conduct from their first to second terminals and are, therefore, in their high impedance state in the absence of an input signal. When no input signal is applied to the circuit, the ferroelectric capacitors are charged by the bias voltage generator until they are in their saturated or high impedance state. As a result, most of the voltage provided by the alternating source appears across the ferroelectric capacitors and the electroluminescent element is in its unexcited or "off" state. At this time, the first and second switches are maintained nonconductive by the bias voltage generator.

The input signal applied to the circuit has a magnitude which determines the brightness of the electroluminescent element. This signal, typically a voltage pulse having a duration of 0.1 microsecond or less, charges the capacitor coupled thereto. Since this charge is essentially a surface charge on the plates of the capacitor rather than a polarization of the dielectric, the capacitor charges instantaneously. The polarity of the input signal is chosen such that the first switch is rendered conductive. This potential decays with a time constant determined by the capacitance and the back resistance of the second switch. The second switch is not rendered conductive by the potential on the capacitor since the capacitor is coupled to the junction between the switches. Also, a shunt resistance may be coupled in parallel with the second switch to control the discharge time of the capacitor.

When the potential on the capacitor renders the first switch conductive, the ferroelectric capacitors discharge through the impedance presented by the first and second switches and the bias voltage generator. Discharging these capacitors reduces the voltage across them and, therefore, a greater fraction of the alternating voltage appears across the electroluminescent elements. The brightness of the electroluminescent element is determined by the amount of charge still remaining on the capacitors which, in turn, is a function of the magnitude of the input signal.

Each of the ferroelectric capacitors exhibits a substantially rectangular charge-voltage characteristic. The bias voltage generator charges the capacitors so that with reference to the alternating voltage source, the capacitors are charged in opposite directions. The instantaneous voltage appearing across the two series-connected ferroelectric capacitors is essentially equal to the instantaneous magnitude of the alternating voltage. However, the portion of the total voltage appearing across each capacitor varies throughout the alternating voltage cycle.

The magnitude of the input signal required to provide a given discharge of the ferroelectric capacitors and a corresponding increase in the voltage across and brightness of the electroluminescent element is a measure of the power gain of the amplifier circuit. However, the ability of an input signal to provide a given discharge has heretofore depended on which portion of the alternating voltage it is applied. The power gain can be maximized by applying the input signal during the negative half-cycle at which time the charge on one ferroelectric capacitor is decreasing and the alternating voltage tends to enhance this decrease.

By selecting the time constant for the decay of the potential on the dielectric capacitor to be long, i.e., several periods, with respect to the period of the alternating voltage, the input signal is applied to the junction of the ferroelectric capacitors to insure maximum power gain without requiring the use of synchronizing circuits. In addition, the discharge time is not limited by the duration of the input signal so that short input pulses, less than 0.1 microsecond, may be employed without materially reducing the voltage gain of the circuit.

Figure 2A:
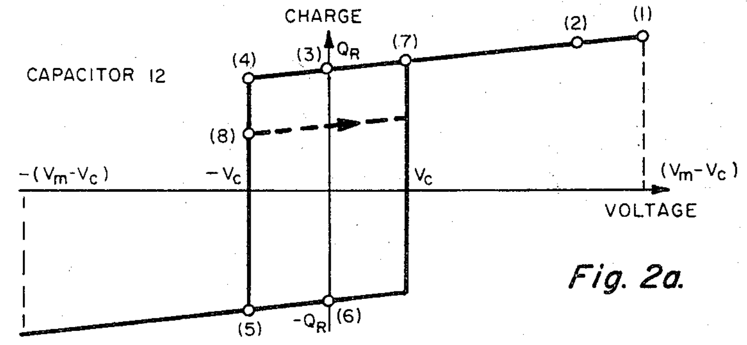
Figure 2B:
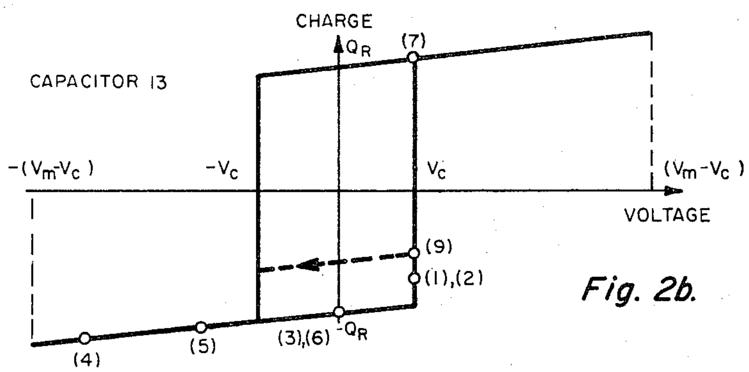
Figure 4:
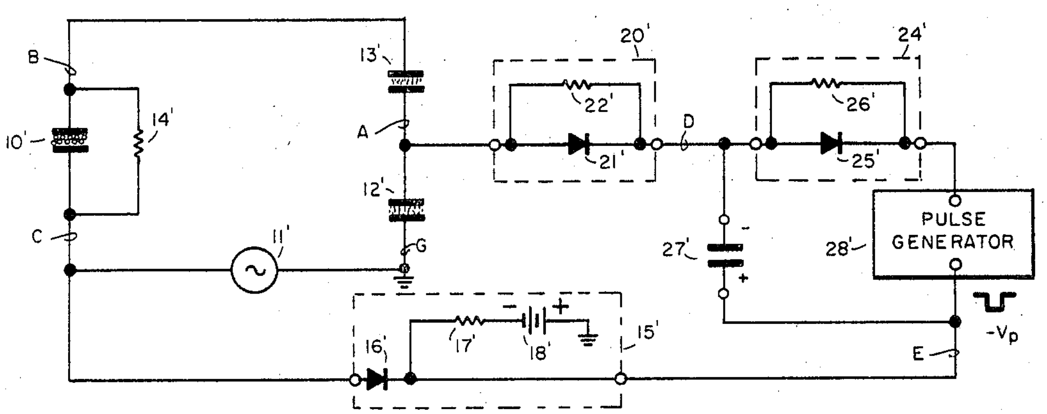

Further features and advantages of the invention will be more apparent from the following description of specific embodiments taken in conjunction with the accompanying drawings, in which:

FIG. 1 is a schematic diagram of one embodiment of the invention;

FIGS. 2*a* and 2*b* depict the relationship between charge and voltage for the ferroelectric capacitors of FIG. 1;

FIGS. 3*a*–3*f* are idealized waveforms existing at various points in the diagram of FIG. 1; and FIG. 4 is a schematic diagram of a second embodiment of the invention.

Referring to FIG. 1, there is shown an electroluminescent element 10 connected in series with an alternating voltage source 11 and first and second ferroelectric capacitors 12 and 13. A resistor 14 is shunted across electroluminescent element 10.

Ferroelectric capacitors 12 and 13, which employ a material such as barium titanate as a dielectric, exhibit the voltage-charge characteristics shown in FIGS. 2*a* and 2*b*. The hysteresis loop of FIG. 2*a*, for example, is a plot of the total charge present in capacitor 12 as a function of the voltage impressed across that capacitor. When a voltage is first applied to such a capacitor, the dielectric material is unpolarized with the domains having a random orientation and the charge and voltage variations increase from zero. Thereafter, the charge variations follow the hysteresis loop as the voltage across the capacitor changes. The voltage across the capacitor when the charge is zero is called the coercive voltage $V_C$ and the total charge in the capacitor when the impressed voltage is zero is termed the remanent charge $Q_R$. The remanent charge $Q_R$ may be either positive or negative depending upon the polarity of the impressed voltage.

A first asymmetrically conductive switch 20, consisting of a diode 21 shunted by a resistor 22, is shown having terminal 40 coupled to the junction of ferroelectric capacitors 12 and 13. A second asymmetrically conductive switch 24, consisting of a diode 25 and a resistor 26 is then coupled to the second terminal 41 of the first switch. Also, a capacitor 27 having first and second terminals 46 and 47 respectively and a series-connected pulse generator 28 having first and second terminals 48 and 49 respectively are connected in parallel with terminals 42 and 43 of second switch 24.

A bias voltage generator 15, comprising a series-connected diode 16, resistor 17 and direct voltage source 18, is coupled across alternating voltage source 11. The output terminal 44 of generator 15 is coupled to the junction of second switch 24 and the parallel branch consisting of pulse generator 28 and capacitor 27. Charging current is supplied to ferroelectric capacitors 12 and 13 by battery 18 through resistor 17 and by the rectified current flowing from alternating source 11 through diode 16. This charging current tends to saturate both capacitors 12 and 13, reducing their capacitance, and increasing their impedance. The total charge on capacitors 12 and 13 at any instant is also determined by the current generated by source 11 which increases the charge on capacitor 12 during the positive half of the cycle (i.e., the direction of current flow indicated by the arrow in FIG. 1) and decreases it during the negative half cycle. The resistors 22 and 26 are provided to insure that bias generator 15 charges the ferroelectric capacitors. However these resistors may be omitted if diodes 21 and 25 have sufficiently low back resistances to permit generator 15 to effectively charge capacitors 12 and 13.

Figure 3:
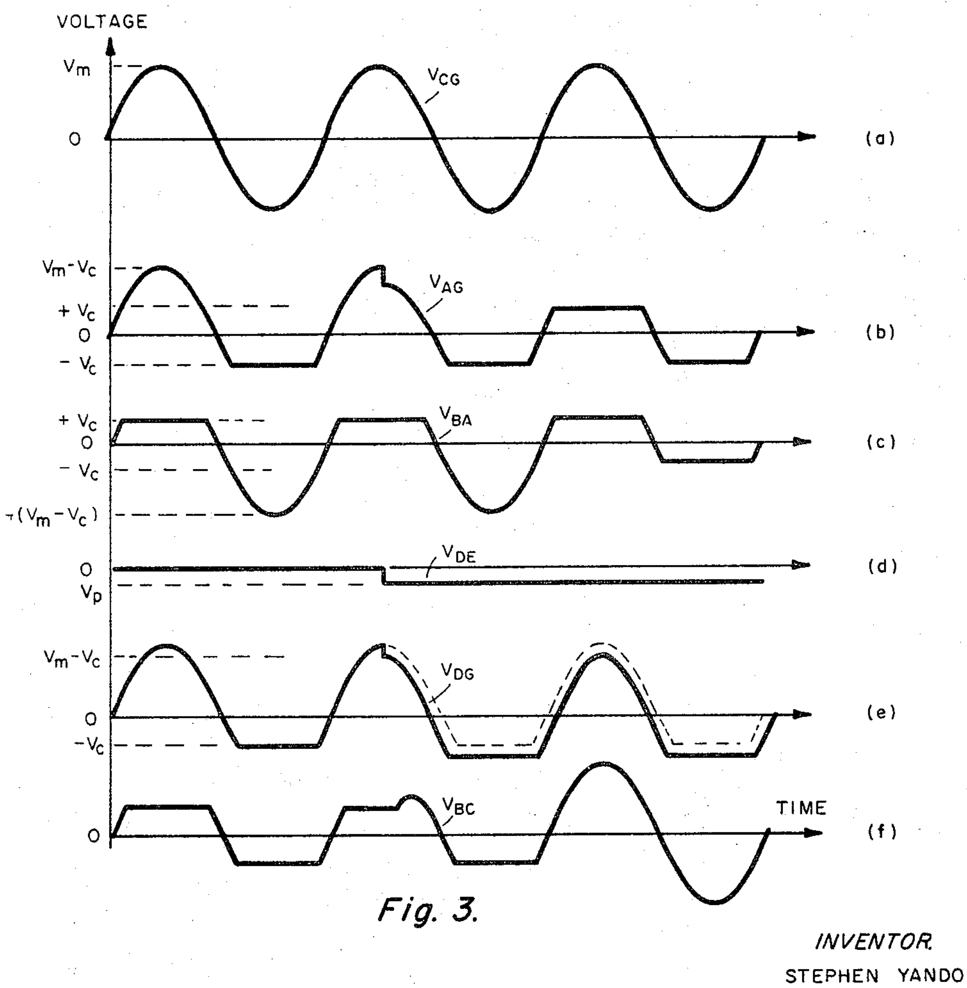

In FIG. 3*a* the alternating voltage $V_{CG}$ of source 11 is shown having a sinusoidal waveform with an amplitude $V_M$ although other waveforms may be employed if desired. During the positive half of the first cycle shown, the voltage $V_{AG}$ across capacitor 12 increases sinusoidally to a value approximately equal to $V_M - V_C$ whereas the voltage $V_{BA}$ across capacitor 13 increases only to $V_C$. During the negative half of the first cycle, voltage $V_{AG}$ is negative and constant at a value $V_C$ whereas the voltage $V_{BA}$ across capacitor 13 charges sinusoidally to a peak value of approximately $V_M - V_C$. As a result, capacitors 12 and 13 have high impedance during alternate half cycles and therefore insufficient voltage is applied across electroluminescent element 10 to cause it to emit light. Element 10 may have a high leakage resistance and, in this case, resistor 14 is provided to permit current flow around the element to charge the capacitors.

In the absence of an input signal from pulse generator 28, diodes 21 and 25 are maintained in their nonconducting states by the voltage provided by bias generator 15. The voltage $V_{DG}$ (FIG. 3*e*) appearing at diode 21 has a magnitude slightly greater than that across capacitor 12 ($V_{AG}$). Since the voltage across capacitor 12 has essentially the same waveform as a displaced half-wave rectified voltage voltage $V_{DG}$ is obtained by rectifying the output of alternating source 11 by diode 16 and adding a voltage slightly less than $-V_C$ from battery 18.

When a positive pulse having a magnitude $V_P$ which is a function of the desired brightness of element 10 is provided by pulse generator 28, diode 25 is rendered conductive to keep the potential at terminal D clamped to the potential at terminal E. Although voltage $V_{DE}$ (FIG. 3*d*) is zero, diode 21 is still nonconductive. Capacitor 27 charges rapidly to a potential $-V_P$ as shown in FIG. 1. At the end of the pulse, the potential at point D goes negative with respect to point E by an amount $-V_P$ whereupon diode 21 is rendered conductive since the voltage $V_{DG}$ becomes less than the voltage $V_{AG}$. As a result, capacitors 12 and 13 discharge through the low resistance paths presented by diode 21 and resistor 22.

The potential on capacitor 27 decays in accordance with the time constant formed by resistance 26 and capacitor 27. This time constant may be made quite long, i.e., several cycles of alternating voltage $V_M$, so that the need to synchronize the pulse with a particular portion of the cycle of voltage $V_M$ is eliminated. Although the circuit of FIG. 1 is shown containing resistor 26, the decay will occur through the back resistance of diode 25 if the resistor is eliminated and this may be desirable for certain applications wherein long time constants are employed. However in television applications, resistor 26 is selected such that the potential $V_{DE}$ of capacitor 27 decays prior to th eoccurence of the next pulse.

At the termination of the pulse, voltages $V_{DE}$ and $V_{DG}$ are decreased by an amount equal to $V_P$ rendering diode 21 conductive. The loss of charge on capacitor 12 changes the operating point from point 1 to point 2 in FIG.2*a* and the voltage $V_{AG}$ thereacross decreases. As a result, the voltage $V_{BC}$ (FIG. 3*f*) across element 10 increases. However, the conductive state of diode 21 has no significant effect on capacitor 13 since it is in its low impedance state at this time. The above changes in voltage continue until the completion of the half-cycle whereupon capacitors 12 and 13 are at point 3. Due to the long time constant mentioned previously, the decay of the potential on capacitor 27 is insubstantial.

At the start of the following half-cycle, the capacitor 13 moves toward point 4 its high impedance state while capacitor 12 moves to its low impedance state. Since capacitor 13 in effect determines the brightness of element 10, the element is not energized. As the half-cycle continues, capacitor 12 continues to discharge toward the voltage at terminal D until at point 5 both capacitors are on the corresponding portions of their hysteresis characteristics. At the end of the negative half-cycle, both capacitors are at point 6.

The following positive half-cycle finds both capacitors having a positive voltage thereacross. At the midpoint of this half-cycle, point 7, the voltage across each is $V_C$ and the capacitors remain on corresponding portions of the hysteresis characteristics. Accordingly, most of the voltage $V_{CG}$ appears across element 10 as shown in FIG. 3*f* and the element emits light. The magnitude of the voltage $V_{BC}$ appearing across the element 10 is controlled by the potential appearing on capacitor 27 which determines the amount of the discharge of the capacitors. While the above example corresponds to the condition of maximum brightness, lower magnitude input signals result in lower voltages appearing across element 10. This is shown by the dotted portion of FIGS. 2*a* and 2*b* whereupon capacitor 12 is discharged only to point 8 and on the next half-cycle capacitor 13 is discharged to point 9. The capacitors 12 and 13 discharge to the point where the voltage $V_{AG}$ is approximately equal to the voltage $V_{DG}$. As the charge on capacitor 27 decays, the bias generator charges the ferroelectric capacitors until the electroluminescent element is extinguished.

A second embodiment is shown in FIG. 4 wherein the pulse generator 28′ is series-connected to second switch 24′. The circuit is responsive to the leading edge of negative-going pulses with capacitor 27′ being charged to a voltage $V_P$ as shown. The operation of the circuit is similar to that previously described for the circuit of FIG. 1.

While the above description has referred to specific embodiments, it will be recognized that many modifications and variations may be made therein without departing from the spirit and scope of the invention.

What is claimed is:

1. A voltage amplifier for varying the voltage across a load impedance in accordance with the magnitude of the voltage output of a signal source which comprises:

(a) first and second series-connected ferroelectric capacitors;

(b) means coupling an alternating source in series with said load impedance and said ferroelectric capacitors;

(c) first asymmetrically conductive switching means having first and second terminals, said first terminal being coupled to the junction of said first and second series-connected ferroelectric capacitors;

(d) a capacitor having first and second terminals, said first terminal being coupled to the second terminal of said first switching means;

(e) second asymmetrically conductive switching means having first and second terminals, said first terminal being coupled to the first terminal of said capacitor;

(f) means coupling a signal source between the second terminal of said second switching means and the second electrode of said capacitor, the output signal from said source charging said capacitor to render said first switching means conductive whereby said ferroelectric capacitors are discharged in accordance with the magnitude of said output signal; and (g) bias voltage means coupled between one of the terminals of said signal source and the junction of the load impedance and the AC signal source, said bias voltage means producing a voltage at said terminal having an instantaneous magnitude exceeding the instantaneous magnitude of the voltage at the junction of said ferroelectrics.

2. Apparatus in accordance with claim 1 in which said asymmetrically conductive switching means are poled to pass current flowing from the first to second terminals.

3. Apparatus in accordance with claim 2 in which said second switch comprises a diode and a resistor coupled in parallel.

4. Apparatus in accordance with claim 3 in which the discharge time constant of said capacitor exceeds the period of the output of said alternating source.

5. Apparatus in accordance with claim 4 in which said bias voltage means comprises:

(a) a diode; and (b) a direct voltage source coupled in series with said diode across said alternating voltage source, the junction between said diode and said direct voltage source being coupled to the second terminal of said second switching means.

6. Apparatus in accordance with claim 5 in which said first and second switching means each comprise a diode and a resistor coupled in parallel therewith.

7. Apparatus in accordance with claim 6 in which said bias voltage means is connected to the second terminal of said capacitor.

8. Apparatus in accordance with claim 6 in which said bias voltage means is connected to the second terminal of said second diode.

References Cited

UNITED STATES PATENTS

| | | | |
|---|---|---|---|
| 3,101,450 | 8/1963 | Takahashi et al. | 330—7 |
| 3,101,452 | 8/1963 | Holcomb et al. | 330—7 X |

ROY LAKE, *Primary Examiner.*

NATHAN KAUFMAN, *Assistant Examiner.*